United States Patent
Creed et al.

(10) Patent No.: US 12,443,532 B2
(45) Date of Patent: Oct. 14, 2025

(54) USING CACHE LOSS SIGNAL AS A BASIS TO OPTIMIZE HIT RATE AND UTILIZATION THROUGH CACHE PARTITIONING

(71) Applicant: Dell Products L.P., Hopkinton, MA (US)

(72) Inventors: John Creed, Innishannon (IE); Owen Martin, Hopedale, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/714,664

(22) Filed: Apr. 6, 2022

(65) Prior Publication Data
US 2024/0232086 A1    Jul. 11, 2024

(51) Int. Cl.
*G06F 12/084* (2016.01)
*G06F 9/50* (2006.01)
*G06F 12/0871* (2016.01)

(52) U.S. Cl.
CPC .......... *G06F 12/084* (2013.01); *G06F 9/5016* (2013.01); *G06F 12/0871* (2013.01)

(58) Field of Classification Search
CPC ... G06F 9/5016; G06F 12/0871; G06F 12/084

USPC .......................................................... 711/118
See application file for complete search history.

(56) References Cited

U.S. PATENT DOCUMENTS

| | | | |
|---|---|---|---|
| 9,984,004 B1* | 5/2018 | Little | G06F 12/0811 |
| 2004/0215883 A1* | 10/2004 | Bamford | G06F 12/0871 |
| | | | 711/129 |
| 2007/0143546 A1* | 6/2007 | Narad | G06F 12/084 |
| | | | 711/130 |
| 2018/0300242 A1* | 10/2018 | Liu | G06F 16/00 |
| 2020/0012602 A1* | 1/2020 | Zhao | G06F 17/11 |
| 2020/0142828 A1* | 5/2020 | Yao | G06F 12/0868 |
| 2021/0026721 A1* | 1/2021 | Wang | G06F 11/0709 |
| 2021/0157725 A1* | 5/2021 | Barbalho | G06F 12/0802 |
| 2022/0035743 A1* | 2/2022 | Martin | G06N 20/00 |

* cited by examiner

*Primary Examiner* — Gautam Sain
(74) *Attorney, Agent, or Firm* — Anderson Gorecki LLP

(57) ABSTRACT

A data storage node includes a plurality of compute nodes that allocate portions of local memory to a shared cache. The shared cache is configured with mirrored and non-mirrored segments. The mirrored and non-mirrored segments are separately configured with pools of data slots. Within each segment, each pool is associated with same-size data slots that differ in size relative to the data slots of other pools. The sizes of the pools in each segment are adjusted to minimize cache loss, where cache loss is the difference between the amount of shared cache used to service IOs and the minimum amount required for servicing the IOs.

20 Claims, 6 Drawing Sheets

|           |      | IO Size |      |      |      |
|-----------|------|---------|------|------|------|
|           |      | R16k    | W16k | R64k | W64k |
| Partition | W128 | 240     | 112  | 192  | 64   |
|           | R128 | 112     | NA   | 64   | NA   |

Cache Loss Table

Figure 6

USING CACHE LOSS SIGNAL AS A BASIS TO OPTIMIZE HIT RATE AND UTILIZATION THROUGH CACHE PARTITIONING

TECHNICAL FIELD

The subject matter of this disclosure is generally related to cache partition allocations in data storage systems.

BACKGROUND

High-capacity data storage systems such as storage area networks (SANs) and storage arrays manage access to host application data stored on arrays of non-volatile drives. The storage systems respond to input-output (IO) commands from instances of host applications that run on host servers. Examples of host applications may include, but are not limited to, software for email, accounting, manufacturing, inventory control, and a wide variety of other business processes. It has long been standard practice in the art to use a single, fixed size data allocation unit for data access so that storage system metadata is practical to manage. The data allocation units are sometimes referred to as tracks (TRKs). The single, fixed TRK size can be selected as a design choice, where TRK size is generally proportional to the manageability of the metadata, but inversely proportional to resource utilization efficiency. Using a larger TRK size can reduce the resource burden on memory and processing resources for metadata management but decreases the efficiency of managed drive utilization by increasing unused space. TRKs are distinct from hard disk drive (HDD) tracks that characterize spinning disk storage architecture. An HDD track is a physical characteristic that corresponds to a concentric band on a platter. TRKs larger in size than HDD tracks and are not limited by the physical architecture of a spinning platter. It has also long been standard practice in the art to mirror the volatile memory of pairs of interconnected storage system compute nodes for failover. Mirroring causes all TRKs in volatile memory of a primary compute node to also be in volatile memory of a secondary compute node so that the secondary compute node can quickly take responsibility for IO processing in the event of failure of the primary compute node.

SUMMARY

It has recently been proposed to implement selective mirroring based on whether data in volatile memory is stored on non-volatile drives. It has also been proposed to simultaneously support multiple data allocation unit sizes. In order to implement selective mirroring, the volatile memory may be divided into mirrored and non-mirrored segments. In order to simultaneously support multiple data allocation unit sizes, pools (partitions) of different sized data slots may be created. Some aspects of the presently disclosed invention are predicated in part on recognition that supporting multiple TRK sizes and implementing selective mirroring creates new problems. Different organizations and different storage nodes tend to generate and service a variety of IO workloads that vary in both size and type. Depending on a variety of factors, the read-to-write ratio of an IO workload and distribution of IO sizes may vary widely. Thus, a default segmentation configuration can lead to inefficient operation and resource starvation. For example, an organization that generates an IO workload that is dominated by large size read IOs will inefficiently utilize the resources of a storage array that is configured with a relatively large, mirrored cache segment and relatively large size non-mirrored cache segment allocations to small data slot size pools.

In accordance with some implementations, a method comprises, in a data storage system comprising a plurality of compute nodes that allocate portions of local cache to a shared cache that is organized into partitions characterized by different data slot sizes: calculating cache loss of each of the partitions as a difference between amount of shared cache used to service IOs and minimum amount required to service the IOs; and changing sizes of at least some of the partitions to reduce aggregate cache loss of all the partitions.

In accordance with some implementations, an apparatus comprises a data storage system comprising a plurality of compute nodes configured to allocate portions of local cache to a shared cache that is organized into partitions characterized by different slot sizes; and at least one cache partition balancer configured to: calculate cache loss of each of the partitions as a difference between amount of shared cache used to service IOs and minimum amount required to service the IOs; and change sizes of at least some of the partitions to reduce aggregate cache loss of all the partitions.

In accordance with some implementations, a non-transitory computer-readable storage medium stores instructions that when executed by a data storage system with a plurality of compute nodes that allocate portions of local cache to a shared cache that is organized into partitions characterized by different slot sizes cause the data storage system to perform a method comprising: calculating cache loss of each of the partitions as a difference between amount of shared cache used to service IOs and minimum amount required to service the IOs; and changing sizes of at least some of the partitions to reduce aggregate cache loss of all the partitions.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 6 illustrates a cache loss table.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system that is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
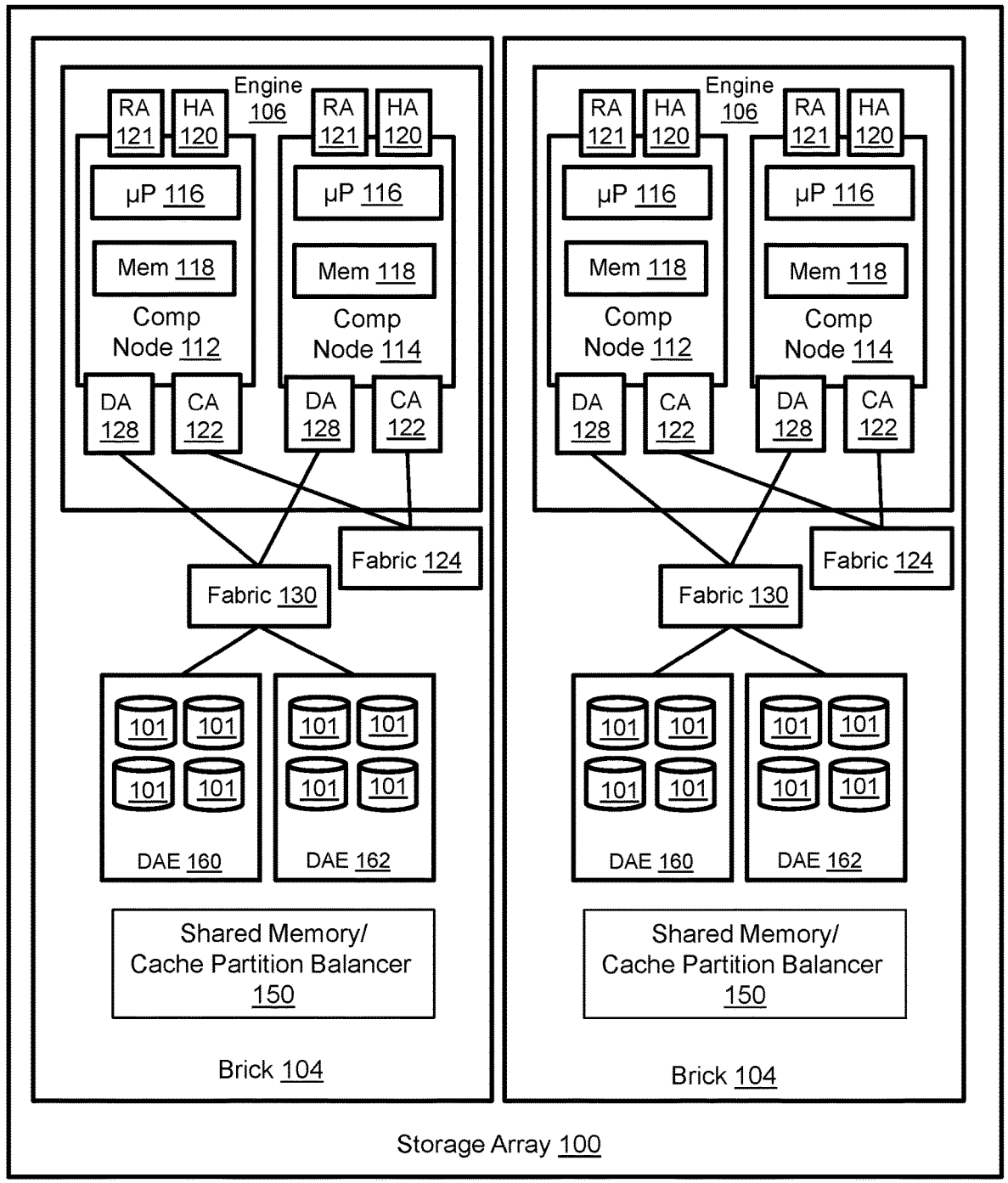
FIG. 1 illustrates a storage array with shared memory/cache partition balancers.

FIG. 1 illustrates a storage array 100 with shared memory/cache segment balancers 150. The storage array 100 includes at least one brick 104. Each brick 104 includes an engine 106 and one or more disk array enclosures (DAEs) 160, 162. Each engine 106 includes two interconnected compute nodes 112, 114 that are arranged as a pair for failover and may be referred to as "storage directors." Although it is known in the art to refer to the compute nodes of a SAN as "hosts," that naming convention is avoided in this disclosure to help distinguish the network server hosts from the compute nodes 112, 114. Nevertheless, the host applications could run on the compute nodes, e.g., on virtual machines or in containers. Each compute node is implemented as a separate blade and includes resources such as at least one multi-core processor 116 and local memory 118. The processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with host servers. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems. Each compute node also includes one or more disk adapters (DAS) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 2:
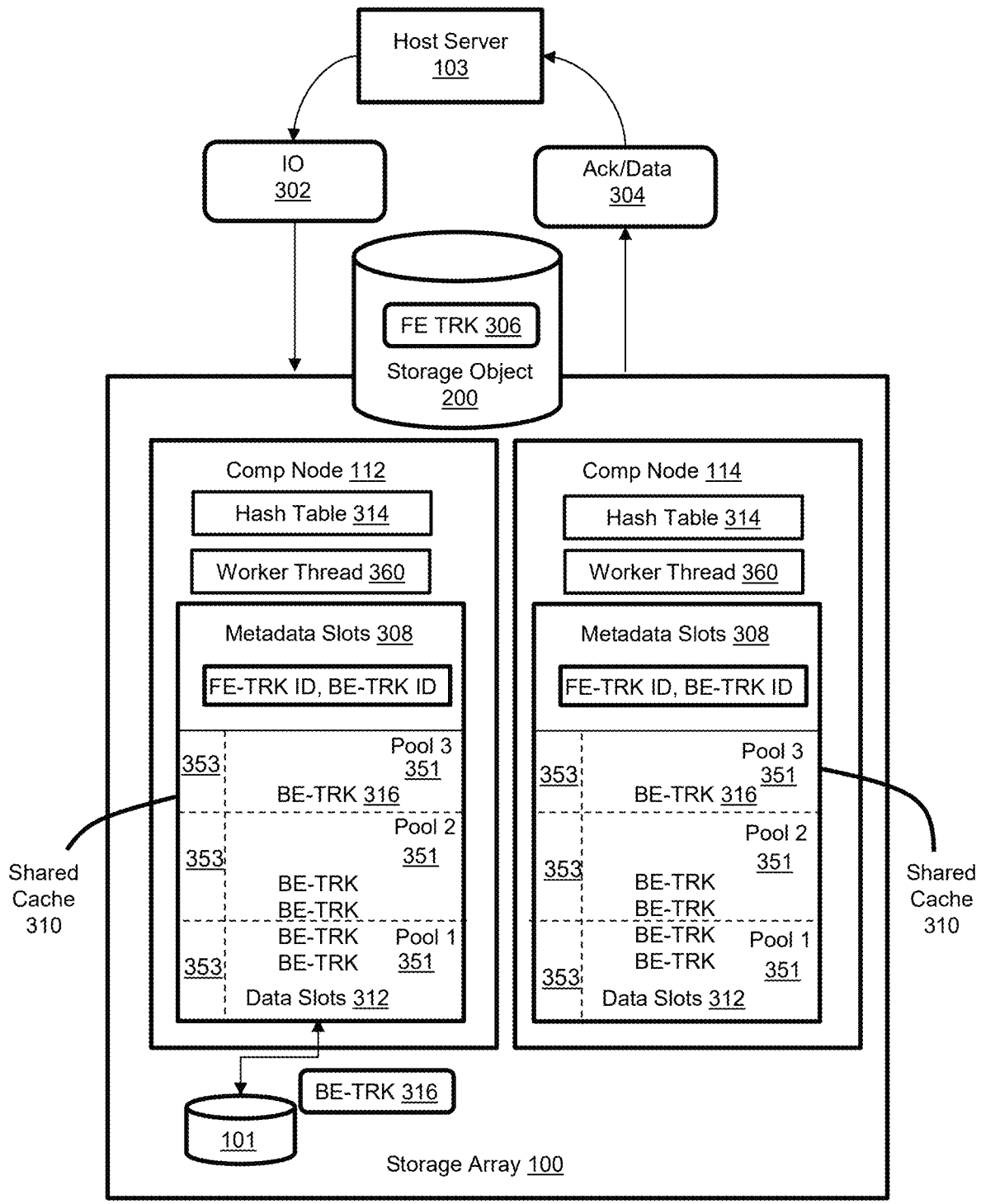
FIG. 2 illustrates IO processing with a shared memory/cache characterized by multiple TRK size pools and mirrored and non-mirrored segments.

Referring to FIGS. 1 and 2, host application data is persistently stored on the managed drives 101 and, because the managed drives are not discoverable by the host servers, logically stored on a storage object 200 that can be discovered by the host servers. Without limitation, a storage object may be referred to as a volume, device, or LUN, where a logical unit number (LUN) is a number used to identify logical storage volumes in accordance with the small computer system interface (SCSI) protocol. From the perspective of the host servers, the storage object is a single disk having a set of contiguous logical block addresses (LBAs) on which data used by the instances of a host application resides. However, the host application data is stored at non-contiguous addresses on various managed drives 101. There may be a large number of host servers and the storage array may maintain a large number of storage objects.

Each compute node 112, 114 allocates a fixed amount of its local memory 118 to a shared cache (aka shared memory) 310 that can be accessed by all compute nodes of the storage array using direct memory access (DMA). The shared cache 310 includes metadata slots 308 and data slots 312, each of which is a fixed allocation of the shared cache 310. The basic allocation units of storage capacity that are used by the compute nodes to access the managed drives are back-end tracks (BE-TRKs). The host application data is logically stored in front-end tracks (FE-TRKs) on the production storage object 200 and actually stored on BE-TRKs on the managed drives. The FE-TRKs are mapped to the BE-TRKs and vice versa by FE-TRK IDs and BE-TRK IDs, which are pointers that are maintained in the metadata slots 308. More specifically, the BE-TRK IDs are pointers to BE-TRKs of host application data in the data slots. The data slots 312, which function to hold data for processing IOs, are divided into a mirrored segment 351 and a non-mirrored segment 353. The mirrored segment is mirrored by both compute nodes 112, 114 of an engine, whereas the non-mirrored segment is not mirrored. Each segment is divided into a plurality of pools (e.g., pool 1, pool 2, pool 3). The sizes of the data slots correspond to the sizes of the BE-TRKs and the terms data slot and BR-TRK maybe used interchangeably when referring to partition and segment allocations. Each pool (partition) contains same-size data slots for holding BE-TRK data, and the sizes of the data slots/BE-TRKs differs between pools. For example, and without limitation, pool 1 may contain only 16 KB data slots, pool 2 may contain only 64 data slots, and pool 3 may contain only 128 KB data slots.

The shared cache 310 is used to service IOs from the host server 103, with the pools being used selectively to reduce wasted space. In the illustrated example, compute node 112 receives an IO 302 from host 103 with storage object 200 as the target. IO 302 could be a Read or Write to a FE-TRK 306 that is logically stored on the storage object 200. A response to a Write IO is an Ack, whereas a response to a Read IO is data. The response is collectively represented as Ack/Data 304. The compute node 112 uses information in the IO to identify a metadata page corresponding to FE-TRK 306, e.g., by inputting information such as the storage object ID and LBAs into a hash table 314. The hash table 314 indicates the location of the corresponding metadata page in the metadata slots 308. The location of the metadata page in the shared cache may be local or remote relative to compute node 112. A BE-TRK ID pointer from that metadata page is obtained and used by the compute node 112 to find the corresponding data slot that contains BE-TRK 316 which is associated with FE-TRK 306. The BE-TRK 316 is not necessarily present in the data slots when the IO 302 is received because the managed drives 101 have much greater storage capacity than the data slots so data slots are routinely recycled to create free data slots. If the IO 302 is a Read and the corresponding BE-TRK 316 is not present in the data slots, then the compute node 112 locates and retrieves a copy of BE-TRK 316 from the managed drives 101. More specifically, the BE-TRK 316 is copied into an empty data slot in the pool with the closest sized data slots that are ≥BE-TRK 316 size in the non-mirrored segment 353. That copy is then used to respond to the host server and the data is eventually flushed from the data slots. If the IO 302 is a Write and the corresponding BE-TRK 316 is not present in the data slots, then the compute node 112 places the Write data into an empty data slot in the pool with the closest sized data slots that are ≥BE-TRK 316 size in the mirrored segment 351. In accordance with mirroring, the data is copied to the corresponding mirrored segment and pool of compute node 114. Worker threads 360 running the background eventually destage the data to BE-TRK 316 on the managed drives, e.g., overwriting the stale data on the managed drives and flushing the data from the data slots.

A race condition exists between the recycling of data slots by worker threads running in the background and use of free data slots in the foreground to service IOs, e.g., to receive data for a pending write. When an appropriately sized data slot is unavailable, a larger size data slot is used. For example, a write IO sized at 8 KB would normally be written to a free data slot in the 16 KB pool of the mirrored segment. However, if there are no free data slots in the 16 KB pool of the mirrored segment then a free data slot in the nearest larger size pool of the mirrored segment is used, e.g., a free data slot from the 64 KB pool or the 128 KB pool. Although this procedure enables the write to be processed, it increases the amount of temporarily wasted space in the shared cache by using a 64 KB or 128 KB data slot rather than a 16 KB data slot for an 8 KB write. Moreover, the unpredictability of the IO workload creates a likelihood that inefficiently large data slot pools will be used in some implementations if a single set of pools size allocations is used in all situations.

Figure 3:
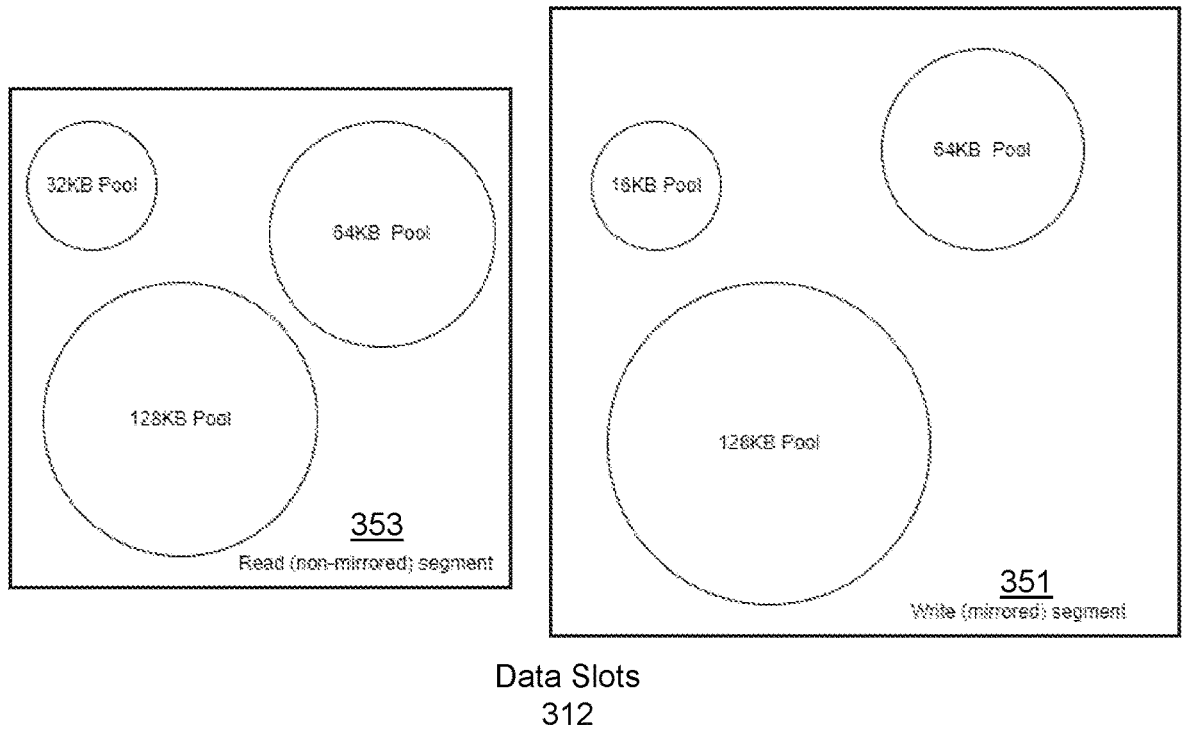
FIG. 3 illustrates one configuration of data slot segments and partitions as percentages of the shared cache.

FIG. 3 illustrates an example configuration of data slot 312 segments and pools with area representing relative percentage of shared cache. The mirrored segment 351, which is used for Write data, may differ in size relative to the non-mirrored segment 353, which is used for Read data. For example, a configuration with a relatively larger mirrored segment 351 may be created for organizations that historically generate Write-heavy IO workloads. In contrast, a configuration with a relatively larger non-mirrored segment 353 may be created for organizations that historically generate Read-heavy IO workloads. Similarly sized mirrored and non-mirrored segments may be created for organizations that historically generate balanced (read: write) IO workloads. In the illustrated example, the non-mirrored segment 353 includes, in ascending order according to size, a pool of 32 KB BE-TRKs, a larger pool of 64 KB BE-TRKs, and a larger pool of 128 KB BE-TRKs. The mirrored segment 351 includes, in ascending order according to size, a pool of 16 KB BE-TRKs, a larger pool of 64 KB BE-TRKs, and a larger pool of 128 KB BE-TRKs. The data slot sizes of the pools can be configured based on cache loss signals as will be described below.

Figure 4:
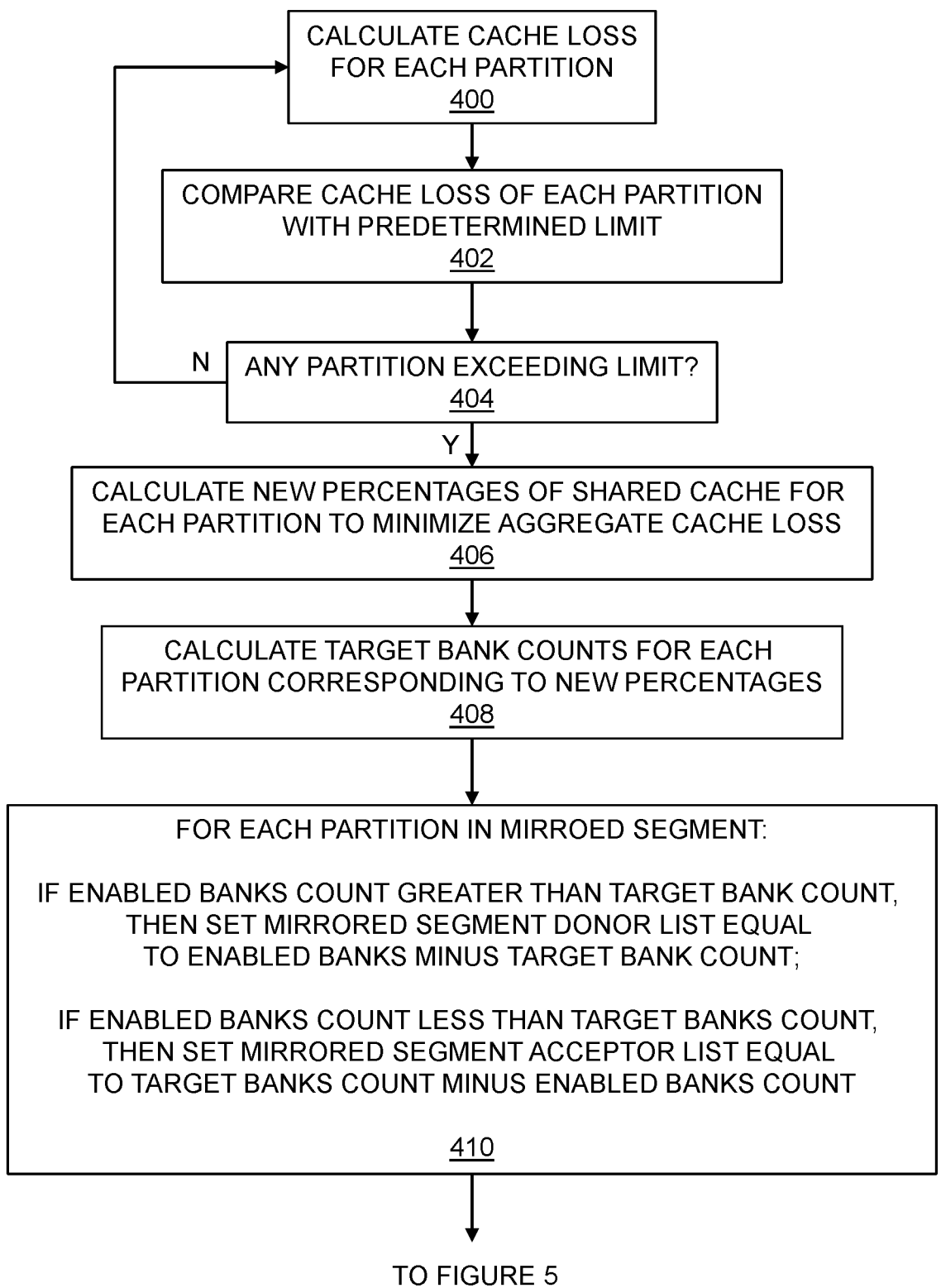
FIGS. 4 and 5 illustrate operation of the shared memory/cache partition balancers.
Figure 5:
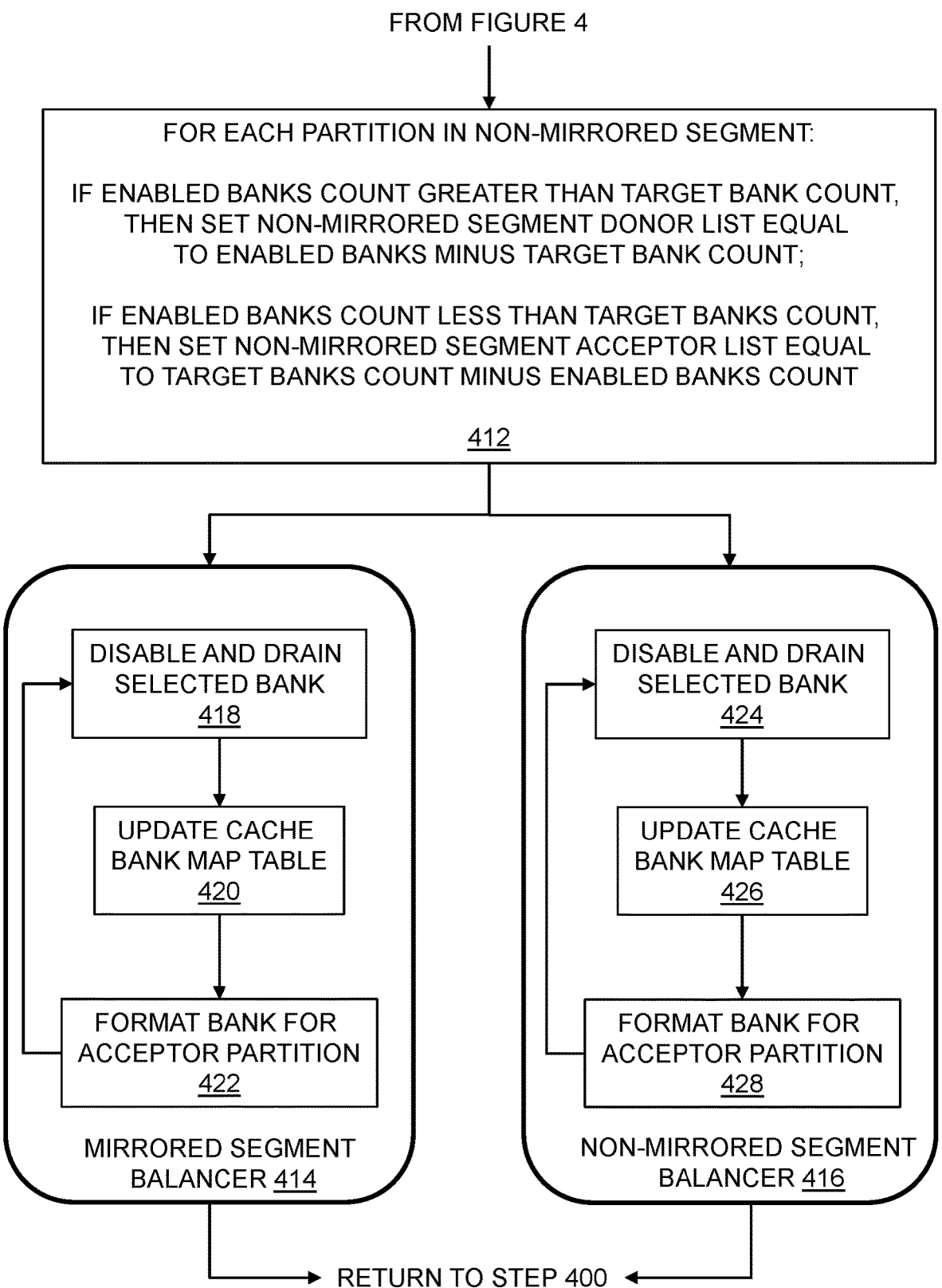

FIGS. 4 and 5 illustrate operation of the shared memory/cache partition balancers. The storage array is initially configured with default percentages of the shared cache allocated to each partition. Step 400 is calculating the cache loss of each partition. Cache loss is the difference between the amount of actual shared cache used and the minimum shared cache needed for the IOs serviced. Continuing with the example from the preceding paragraph, cache loss for the IO would have been 16 KB-8 KB-8 KB if a data slot in the 16 KB pool had been free, but instead is either 64 KB-8 KB-56 KB or 128 KB-8 KB-120 KB depending on whether a data slot in the 64 KB pool is free. The cache loss may be calculated for all TRKs present in the data slots or all IOs serviced over some period of time. The cache loss calculations may be represented by a cache loss table as shown in FIG. 6. The table shows the cache losses for various IO types on the mirrored and non-mirrored 128 KB partitions W128, R128. For example, if IO path uses a W128 cache slot for a 16 KB write IO then there is a Cache Loss=112 KB for that IO. Using data slots in the mirrored segment for reads exacerbates the cache loss. For example, if IO path uses a W128 cache slot for a 16 KB read IO then there is a Cache Loss=240 KB for that IO. Referring again to FIGS. 4 and 5, step 402 is comparing the cache loss of each partition with a predetermined cache loss limit. Different limits may be assigned to different partitions, e.g., based on data slot size and whether the segment is mirrored or non-mirrored. If none of the partitions exceed their limits as determine in step 404, then flow returns to step 400 and monitoring continues. If any of the partitions exceed their limits as determine in step 404, then new percentages of shared cache are calculated for each partition to minimize aggregate cache loss. More specifically, updated percentages are calculated based on the cache losses calculated in step 402. Step 408 is calculating target cache bank counts for each partition corresponding to the updated percentages of shared cache. A bank is a fixed-size chunk of cache with a size that is less than the sizes of partitions. For example, a bank size of 0.25 GB might be used.

Step 410 is calculating a donor/acceptor list for the mirrored segment. Each partition in the mirrored segment is analyzed independently. If the count of enabled banks is greater than the (new) target bank count, then the mirrored segment donor list entry is set equal to the difference between the enabled bank count and the target bank count. The number of enabled cache banks in a partition is the number of cache banks that the partition contains, and which are currently serving cache slot allocations. The modifier "enabled" is used because cache banks can be logically and physically enabled/disabled. If the count of enabled banks is less than the target bank count, then the mirrored segment acceptor list entry is set equal to the difference between the enabled bank count and the target bank count.

Step 412 is calculating a donor/acceptor list for the non-mirrored segment. Each partition in the non-mirrored segment is analyzed independently. If the count of enabled banks is greater than the (new) target bank count, then the non-mirrored segment donor list entry is set equal to the difference between the enabled bank count and the target bank count. If the count of enabled banks is less than the target bank count, then the non-mirrored segment acceptor list entry is set equal to the difference between the enabled bank count and the target bank count.

A mirrored segment balancer 414 reallocates mirrored banks from donors to acceptors. The balancer must first logically disable a relevant cache bank. When a cache bank is logically disabled it cannot be used for a new incoming IOs. Once a relevant bank is disabled, the contents of that bank are freed by running a disabled banks scan on that bank so as to allow any write data to be saved to disk and to ensure the bank is completely free before being formatted. A single donor bank is selected, disabled, and drained of data as indicated in step 418. In step 420 the balancer updates the cache bank map table for the system to reflect that the cache bank is associated with a different partition. In step 422 the entire bank is formatted, including its metadata, because the size of each slot in the bank is changed to the size associated with the new partition. The non-mirrored segment balancer 416 operates in the same manner, with step 424, 426, and 428 corresponding to steps 418, 420, and 422, respectively, although for the non-mirrored partitions. The processes are iterated, one bank at a time by each balancer, until the enabled bank count for each partition equals the target bank count. Flow then returns to step 400.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
in a data storage system comprising a plurality of compute nodes that allocate portions of local cache to a shared cache that is organized into a plurality of partitions, each of the partitions containing data slots of only one size in terms of storage capacity, different ones of the partitions being characterized by different data slot sizes, each external input-output (IO) received by one of the compute nodes being serviced by selecting an unallocated data slot that is equal to or larger in size than the IO and allocating that data slot for servicing the IO and deallocating that data slot after servicing the IO, and wherein at least some of the IOs are smaller in size than the data slots allocated to service those IOs, resulting in a cache efficiency loss for that IO equal to the difference between the data slot size and the IO size, steps comprising:
calculating cache efficiency loss of each of the partitions due to allocated data slots being greater in size than the IOs serviced with those allocated data slots, the cache efficiency loss calculated as a difference between amount of shared cache allocated to service the IOs and amount of shared cache used to cache the IOs, where amount of shared cache allocated to service the IOs equals the product of the number of IOs serviced and the size of the data slots of the partition and the amount of shared cache used to cache the IOs equals a sum of sizes of IOs serviced with the data slots of the partition; and
reducing cache efficiency loss of all the partitions in aggregate based on the calculated cache efficiency loss of each of the partitions by increasing how many data slots of a first size are maintained by the data storage system and decreasing how many data slots of a second size are maintained by the data storage system, where the data slots of the first size contribute less to cache efficiency loss than the data slots of the second size.

2. The method of claim 1 further comprising changing the sizes of at least some of the partitions contingent upon the cache efficiency loss of at least one of the partitions exceeding a predetermined limit.

3. The method of claim 1 further comprising calculating updated percentages of the shared cache for each of the partitions to minimize aggregate cache efficiency loss of all the partitions.

4. The method of claim 3 further comprising calculating target bank counts for each of the partitions based on the updated percentages.

5. The method of claim 4 further comprising updating a record in compute node memory of cache bank donors and cache bank acceptors based on differences between enabled cache bank counts and target cache bank counts.

6. The method of claim 5 further comprising reallocating cache banks from donor partitions to acceptor partitions.

7. The method of claim 6 further comprising reallocating cache banks from mirrored donor partitions to mirrored acceptor partitions and reallocating cache banks from non-mirrored donor partitions to non-mirrored acceptor partitions.

8. A non-transitory computer-readable storage medium storing instructions that when executed by a data storage system with a plurality of compute nodes that allocate portions of local cache to a shared cache that is organized into a plurality of partitions, each of the partitions containing data slots of only one size in terms of storage capacity, different ones of the partitions being characterized by different slot sizes, each external IO received by one of the compute nodes being serviced by selecting an unallocated data slot that is equal to or larger in size than the IO and allocating that data slot for servicing the IO and afterwards deallocating that data slot, cause the data storage system to perform a method comprising:
calculating cache efficiency loss of each of the partitions due to allocated data slots being greater in size than the IOs serviced with those allocated data slots, the cache efficiency loss calculated as a difference between amount of shared cache allocated to service the IOs and amount of shared cache used to cache the IOs; and
reducing cache efficiency loss of all the partitions in aggregate based on the calculated cache efficiency loss of each of the partitions by increasing how many data slots of a first size are maintained by the data storage system and decreasing how many data slots of a second size are maintained by the data storage system, where the data slots of the first size contribute less to cache efficiency loss than the data slots of the second size.

9. The non-transitory computer-readable storage medium of claim 8 in which the method further comprises changing sizes of at least some of the partitions to reduce aggregate cache efficiency loss of all the partitions contingent upon the cache efficiency loss of at least one of the partitions exceeding a predetermined limit.

10. The non-transitory computer-readable storage medium of claim 8 in which the method further comprises calculating updated percentages of the shared cache for each of the partitions to minimize aggregate cache efficiency loss of all the partitions.

11. The non-transitory computer-readable storage medium of claim 10 in which the method further comprises calculating target bank counts for each of the partitions based on the updated percentages.

12. The non-transitory computer-readable storage medium of claim 11 in which the method further comprises updating a record of cache bank donors and cache bank acceptors based on differences between enabled cache bank counts and target cache bank counts.

13. The non-transitory computer-readable storage medium of claim 12 in which the method further comprises reallocating cache banks from donor partitions to acceptor partitions.

14. The non-transitory computer-readable storage medium of claim 13 in which the method further comprises reallocating cache banks from mirrored donor partitions to mirrored acceptor partitions, and reallocating cache banks from non-mirrored donor partitions to non-mirrored acceptor partitions.

15. An apparatus comprising:
a data storage system comprising a plurality of compute nodes configured to allocate portions of local cache to a shared cache that is organized into a plurality of partitions, each of the partitions containing data slots of only one size in terms of storage capacity, different ones of the partitions being characterized by different slot sizes, each external IO received by one of the compute nodes being serviced by selecting an unallocated data slot that is equal to or larger in size than the IO and allocating that data slot for servicing the IO and afterwards deallocating that data slot; and
at least one cache partition balancer configured to:
calculate cache efficiency loss of each of the partitions due to allocated data slots being greater in size than the IOs serviced with those allocated data slots, the cache efficiency loss calculated as a difference between amount of shared cache allocated to service the IOs and amount of shared cache used to cache the IOs; and
based on the calculated cache efficiency loss of each of the partitions, increase how many data slots of a first size are maintained by the data storage system and decrease how many data slots of a second size are maintained by the data storage system to reduce cache efficiency loss of all the partitions in aggregate, where the data slots of the first size contribute less to cache efficiency loss than the data slots of the second size.

16. The apparatus of claim 15 further comprising at least one cache partition balancer configured to calculate updated percentages of the shared cache for each of the partitions to minimize aggregate cache efficiency loss of all the partitions.

17. The apparatus of claim 16 further comprising at least one cache partition balancer configured to calculate target bank counts for each of the partitions based on the updated percentages.

18. The apparatus of claim 17 further comprising at least one cache partition balancer configured to update a record of cache bank donors and cache bank acceptors based on differences between enabled cache bank counts and target cache bank counts.

19. The apparatus of claim 18 further comprising at least one cache partition balancer configured to reallocate cache banks from donor partitions to acceptor partitions.

20. The apparatus of claim 19 further comprising at least one cache partition balancer configured to reallocate cache banks from mirrored donor partitions to mirrored acceptor partitions, and reallocating cache banks from non-mirrored donor partitions to non-mirrored acceptor partitions.

* * * * *